(12) United States Patent
Sjöholm

(10) Patent No.: US 9,429,950 B2
(45) Date of Patent: Aug. 30, 2016

(54) METHOD AND A ROBOTIC WORK TOOL SYSTEM WITH A CHARGING STATION AND A BOUNDARY WIRE

(71) Applicant: HUSQVARNA AB, Huskvarna (SE)

(72) Inventor: Ludvig Sjöholm, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/767,071

(22) PCT Filed: Feb. 20, 2013

(86) PCT No.: PCT/SE2013/050145
§ 371 (c)(1),
(2) Date: Aug. 11, 2015

(87) PCT Pub. No.: WO2014/158060
PCT Pub. Date: Oct. 2, 2014

(65) Prior Publication Data
US 2016/0000005 A1    Jan. 7, 2016

(51) Int. Cl.
*G05D 1/00* (2006.01)
*G05D 1/02* (2006.01)
*A01D 34/00* (2006.01)
*B25J 9/00* (2006.01)

(52) U.S. Cl.
CPC ............ *G05D 1/0265* (2013.01); *A01D 34/008* (2013.01); *G05D 1/0225* (2013.01); *A47L 2201/02* (2013.01); *B25J 9/0003* (2013.01); *G05D 2201/0208* (2013.01); *Y10S 901/01* (2013.01)

(58) Field of Classification Search
CPC ............ A01D 34/008; G05D 1/0225; G05D 1/0259; G05D 1/0265; G05D 1/03; G05D 2201/0208; G05D 2201/0201; A47L 2201/00; B25J 9/0003; Y10S 901/01; B62D 1/28; B62D 1/283
See application file for complete search history.

(56) References Cited

U.S. PATENT DOCUMENTS

2011/0202307 A1    8/2011  Petereit et al.

FOREIGN PATENT DOCUMENTS

| EP | 2413215 A2 | 2/2012 |
| WO | 2011129728 A1 | 10/2011 |
| WO | 2012005642 A1 | 1/2012 |

OTHER PUBLICATIONS

International Search Report and Written Opinion of corresponding application No. PCT/SE2013/050145 mailed Jan. 17, 2014, all enclosed pages cited.
Chapter I International Preliminary Report on Patentability of corresponding application No. PCT/SE2013/050145 mailed Sep. 3, 2015, all enclosed pages cited.

*Primary Examiner* — Spencer Patton
(74) *Attorney, Agent, or Firm* — Nelson Mullins Riley & Scarborough LLP

(57) ABSTRACT

A robotic work tool system (200), comprising a charging station (210), a boundary wire (250) and a signal generator (240) for generating and transmitting a signal through said boundary wire (250) for demarcating a work area (205), said robotic work tool system (200) further comprising a robotic work tool (100) configured to detect a magnetic field strength (M1, M2) in the work area (205) and said robotic work tool system (200) being configured to adapt a current level of the signal being transmitted through the boundary wire (250) based on the detected magnetic field strength (M1, M2).

13 Claims, 2 Drawing Sheets

METHOD AND A ROBOTIC WORK TOOL SYSTEM WITH A CHARGING STATION AND A BOUNDARY WIRE

TECHNICAL FIELD

This application relates to a method and a robotic work tool system for improved power consumption, and in particular to a method and method and a robotic work tool system for improved power consumption while ensuring a safe operation.

BACKGROUND

Many contemporary robotic working tools, such as robotic lawnmowers, are designed to work in a work area defined by a boundary wire. A signal generator is configured to transmit a current signal through the boundary wire which generates a magnetic field around the boundary wire that the robotic work tool is configured to detect and thereby determine if and when it crosses the boundary wire. This enables the robotic work tool to remain inside the work area. To increase the safety of the robotic work tool, the robotic work tool is configured to determine, based on the sensed magnetic field, whether or not it is within the work area or not, and not only if it crosses the boundary wire. This enables for a safer operation in that the robotic work tool can not be activated outside the work area. To enable such operation the robotic work tool is configured to detect the magnetic field emanating from the boundary wire all through the work area.

Also, other robotic work tool systems that are arranged adjacent or in a relatively close proximity to a work area of the robotic work tool may disturb the robotic work tool if the signals transmitted by the other robotic work tool systems interfere with the signals (and the generated magnetic field) of the robotic work tool. This may cause the robotic work tool to malfunction or discontinue its operation which may lead to unsafe operation.

Also, some contemporary robotic work tools are configured to sense a magnetic field emanating from a cable loop (or other transmitter) arranged in close proximity to a charging station to enable the robotic work tool to return to the charging station without having to follow a specific boundary wire or guide cable.

To enable such operation(s), the signal generator must supply a current that is strong enough to generate a magnetic field that can be sensed or detected throughout the work area. As robotic work tools are designed to operate in diverse work areas often of different size, it is difficult for the designers to set the current strength appropriately and the current strength is usually set too high for most applications to ensure that the magnetic field will be detectable throughout the whole (or most of the) work area. This leads to unnecessarily high power consumption.

There is thus a need for a robotic work tool system where the robotic work tool is capable of detecting the magnetic field all through the work area without wasting power.

SUMMARY

It is an object of the teachings of this application to overcome the problems listed above by providing a robotic work tool system, comprising a charging station, a boundary wire and a signal generator for generating and transmitting a signal through said boundary wire for demarcating a work area, said robotic work tool system further comprising a robotic work tool configured to detect a magnetic field strength in the work area and said robotic work tool system being configured to adapt a current level of the signal being transmitted through the boundary wire based on the detected magnetic field strength.

In one embodiment the robotic work tool is configured to determine that the detected magnetic field strength is below a detectable level and if so return to the charging station, whereby the robotic work tool system is configured to adapt the current level accordingly.

In one embodiment the robotic work tool is configured to detect a surrounding noise level and wherein the robotic work tool system is further configured to determine whether the surrounding noise level is higher than a threshold value and, if so, adapt the current level accordingly.

In one embodiment the robotic work tool is a robotic lawnmower.

It is also an object of the teachings of this application to overcome the problems listed above by providing a method for use in a robotic work tool system comprising a charging station, a boundary wire and a signal generator for generating and transmitting a signal through said boundary wire for demarcating a work area and a robotic work tool, said method comprising detecting a magnetic field strength in the work area and adapting a current level of the signal being transmitted through the boundary wire based on the detected magnetic field strength.

The inventors of the present invention have realized, after inventive and insightful reasoning, that by measuring the magnetic field it is possible to adapt the current level to ensure that the magnetic field is at a specific minimum level while reducing the power consumption of the system. The teachings herein find use in robotic work tool systems such as robotic lawnmower systems.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
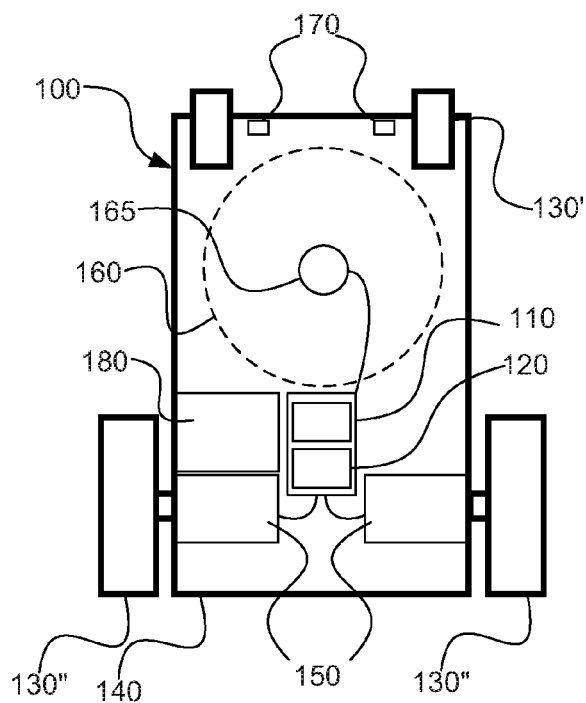
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are driveably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, CMOS, FLASH, DDR, SDRAM or some other memory technology.

The robotic work tool 100 further has at least one sensor 170, in the example of FIG. 1 there are two sensors 170, arranged to detect a magnetic field (not shown). The sensors are connected to the controller 110 and the controller 1110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a robotic lawnmower.

The robotic work tool 100 also has (at least) one battery 180 for providing power to the motors 150 and the cutter motor 165.

Figure 2:
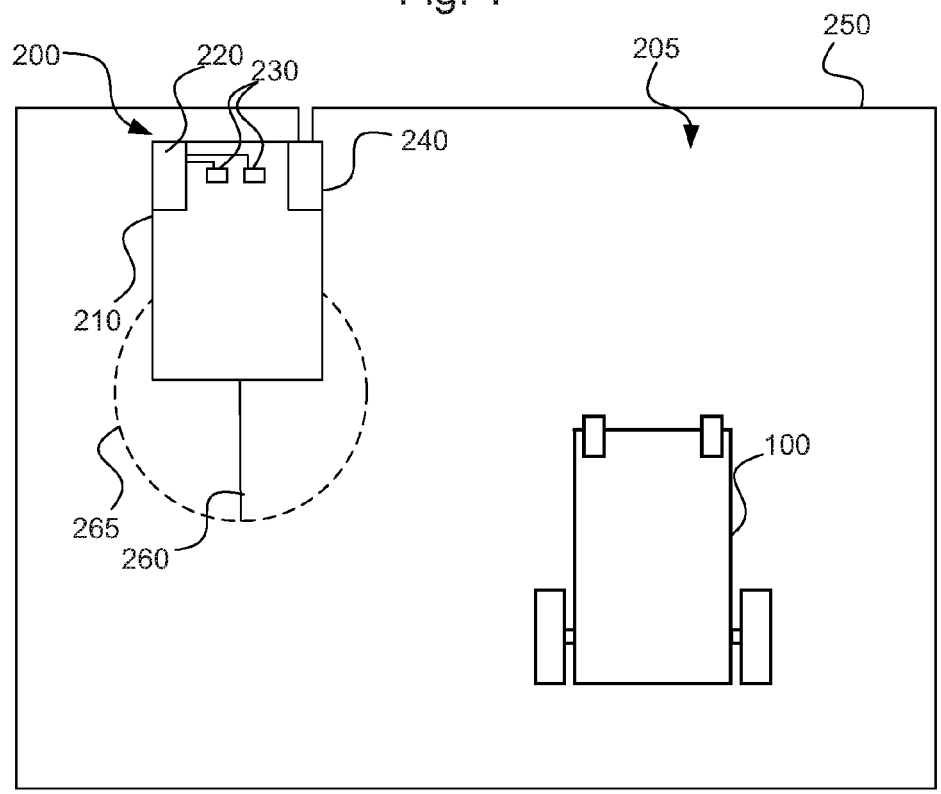
FIG. 2 shows a schematic view of a robotic working tool system according to one embodiment of the teachings of this application.

FIG. 2 shows a schematic view of a robotic working tool system 200 comprising a charging station 210 and a boundary wire 250 arranged to enclose a working area 205, the working area 205 not necessarily being a part of the robot system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robot to follow the boundary wire 250, for example when returning to the charging station 210 for charging.

Optionally, the charging station 210 also has a guide cable 260 for enabling the robot to find the entrance of the charging station 210. In one embodiment the guide cable 260 is formed by a loop of the boundary wire 250.

In one embodiment the guide wire 260 is used to generate a magnetic field 265 for enabling the robotic work tool 100 to find the charging station without following a guide cable 260. The field is sometimes referred to as an F-range indicating the range within which the field can be sensed. The F-range 265 may be generated by the guide cable 260 or other cable, possibly being arranged in a loop, or other means for generating a magnetic field.

The robotic work tool 100 may then find the charging station 210 by following the F-range 265 towards an increasing field strength.

By sending different current pulses through the guide cable 260 and the boundary wire 250, and possibly by generating the magnetic field in the F-range using a different current profile, the robotic work tool 100 will be able to determine which magnetic field results from which cable/field. The different control signals may for example comprise coded signals that differentiate the cables 250, 260.

Figure 3:
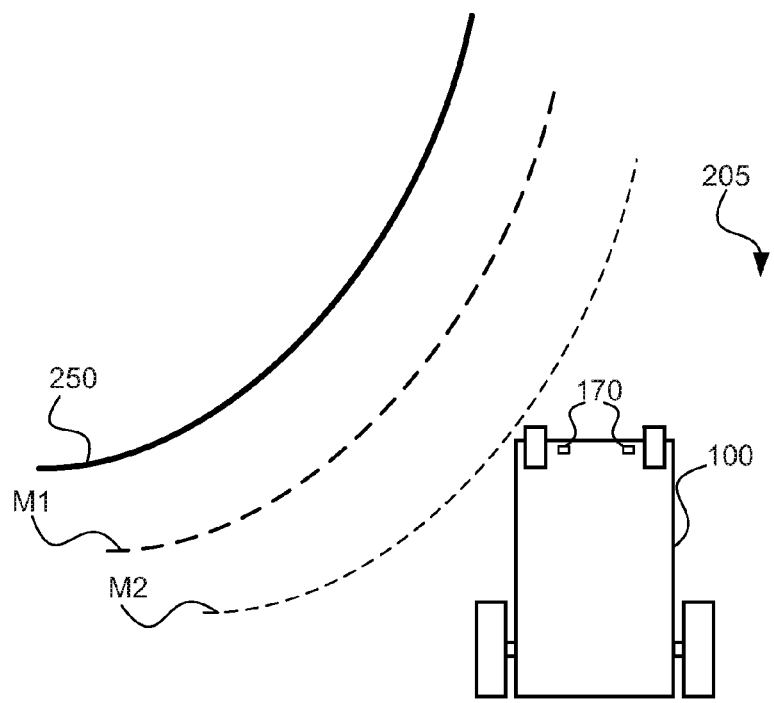
FIG. 3 shows a schematic magnetic field distribution in a work area according to one embodiment of the teachings of this application.

FIG. 3 shows a schematic view of a robotic work tool system, such as the robotic work tool system 200 of FIG. 2, where a boundary wire 250 emits a magnetic field that is sensed by the sensors 170 of a robotic work tool 100, such as the robotic work tool 100 of FIG. 1. The magnetic field is shown schematically as two field waves M1 and M2 of different strength (as indicated by the different thickness of the dashed lines M1 and M2) as the strength of the magnetic field depends on the distance from the boundary wire 250.

To enable the robotic work tool 100 and the robotic work tool system 200 to adjust the current level in the boundary wire 250, the robotic work tool 100 is configured to detect and store the detected magnetic field strength M1, M2 through out the work area 205. The detected magnetic field strength is then compared to a stored maximum magnetic field strength value and if the detected magnetic field strength is higher than the stored maximum magnetic field strength value the signal generator (referenced 240 in FIG. 2, but not shown in FIG. 3) is adapted to decrease the current level of the signal being transmitted through the boundary wire 250. In one embodiment the stored maximum magnetic field strength value is 5000 T.

The detected magnetic field strength may also be compared to a stored minimum magnetic field strength value and if the detected magnetic field strength is lower than the stored minimum magnetic field strength value the signal generator (referenced 240 in FIG. 2, but not shown in FIG. 3) is adapted to increase the current level of the signal being transmitted through the boundary wire 250. In one embodiment the stored minimum magnetic field strength value is 2000 T.

The comparison may be performed by the controller (referenced 110 in FIG. 1, but not shown in FIG. 3) of the robotic work tool 100 or by a controller of the charging station (referenced 210 in FIG. 2, but not shown in FIG. 3) or of the signal generator 240. It should be noted that in the following description there will be made no distinction whether the comparison and any adaptation is performed by the charging station 210 or the signal generator 240, the signal generator 240 possibly being part of the charging station 210.

This enables the robotic work tool system 200 to maintain the current level at a level where the safe operation of the robotic work tool 100 is ensured by ensuring that the minimum detected magnetic field strength is above a minimum level and to maintain the power consumption at a low level by ensuring that minimum detected magnetic field strength is not too high, that is exceeding a certain maximum magnetic field strength value.

In one embodiment the robotic work tool 100 is configured to store the detected magnetic field strength by only storing a minimum detected magnetic field strength. This enables for a simple comparison as only the minimum detected magnetic field strength is compared.

The comparison may also be based on a more complex model where different areas of the work area 205 are analyzed individually. In such an embodiment the robotic work tool 100 is configured to store multiple values for the detected magnetic field strength M1, M2. For example the robotic work tool system 200 may be designed so that a part of the work area is enclosed by structures in which case the magnetic field strength in that particular work area portion is of less importance and may drop below a detectable minimum.

In one embodiment the robotic work tool 100 is configured to communicate with the charging station 210 (or the signal generator 240) to instruct the charging station 210 to adapt (that is increase or decrease) the current level. The communication may be effected wirelessly during a working operation, such as when mowing a lawn. The wireless communication may be effected by a radio frequency communication protocol such as known in the technical filed of telecommunication.

The communication may also or alternatively be effected during a charging session. The communication during the charging session may be effected through a wireless communication protocol or a wired communication protocol, possibly via the charging contacts.

In one embodiment the robotic work tool 100 is configured to communicate with the charging station through electronic signalling via the charging plates 230.

In one embodiment the robotic work tool 100 is configured to communicate with the charging station by the robotic work tool 100 exerting short current pulses to the motors 150 driving the wheels 130". The pulses cause the wheels to vibrate against for example a bottom plate (not shown) of the charging station 210 and the charging station 210 is configured to detect and interpret such vibrations. The vibrations may be arranged to encode a message which is received and interpreted by the charging station 210.

In one embodiment the charging station 210 may be configured to communicate with the robotic work tool 100 by encoding a message and transmitting it via the boundary wire 250. The robotic work tool 100 is configured to sense the magnetic field of the boundary wire 250 and analyze and interpret the message transmitted. This enables the robotic work tool system 200 to adapt the current level of the transmitted signal so that the power consumption is not unnecessarily high.

In one embodiment the robotic work tool 100 is configured to return to the charging station if it is determined that the detected magnetic field strength falls below a detectable level, for example 2000 T. If the robotic work tool 100 detects that the detected magnetic field strength falls too low, the robotic work tool is configured to communicate this fact to the charging station 210 and the charging station 210 would thus adapt the current level accordingly. In an embodiment where the robotic work tool 100 is configured to communicate with the charging station 210 during a charging session, the robotic work tool 100 may be configured to cancel the working session, return to the charging station 210 to communicate that the current level should be increased for a successful and safe working operation. After the communication has been effected, the robotic work tool 100 may either finish the charging session or return and resume the cancelled working operation.

In one embodiment the robotic work tool system 200 is also enabled to adapt its operation according to noise in the work area 205. In such an embodiment the robotic work tool 100 is also configured to detect and possibly store noise and possibly determine a noise to signal ration (SNR) or simply a maximum noise level. If it is determined that the noise (noise level or SNR) is higher than a threshold value, possibly being dependent on the transmitted signal strength, the charging station 210 adapts the current level accordingly.

The robotic work tool 200 is configured to adapt the current level by trying to reach a fixed, positive marginal between the lowest allowed magnetic field level and actual lowest magnetic field level that is collected over the working area. If this marginal is too low, it instructs the charging station to increase its boundary wire current level. If the marginal is unnecessarily high, it instructs the charging station to lower its boundary wire current level.

The detected field strength may be proportional to the boundary wire current level, but the relation between them is different on every spot within the working area 205. As would be apparent to a skilled person it would be an unmotivated effort to list all possible relationships at all points of all possible work areas 205 in this application. A skilled person would be able to deduce such relationships for a given system to be designed or adapted according to the teachings herein. The robotic work tool 100 may be configured to determine the relationship by using field strength level feedback from the robotic work tool 100 to the charging station 210.

Figure 4:
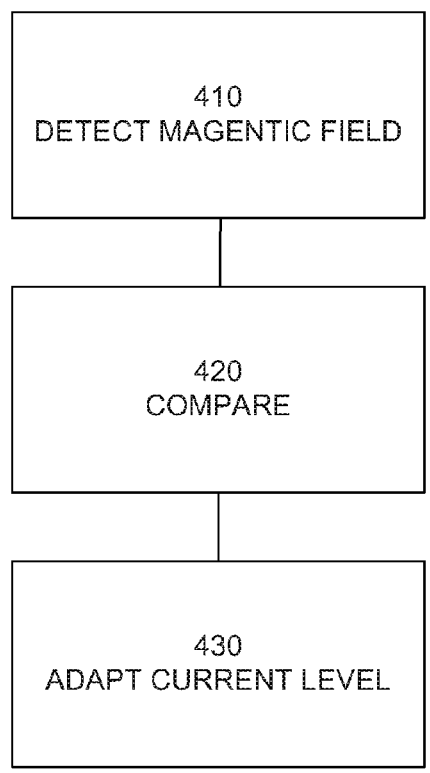
FIG. 4 shows a flowchart for a method according to one embodiment of the teachings of this application.

FIG. 4 shows a flow chart for a general method according to the teachings herein which will be described with simultaneous reference to FIGS. 1, 2 and 3. The robotic work tool 100 detects 410 a magnetic field strength in a work area. The detected magnetic field is compared to a threshold value 420 and the current level of the transmitted signal is adapted 430 accordingly by the charging station, the signal generator or the robotic work tool 100.

It should be noted that the teachings disclosed herein referring to detecting and adjusting the magnetic field emanating from a boundary wire 250 may also be applied to adjusting the magnetic field constituting the so-called F-range. The F-range is thus an example of a second magnetic field emanating from a second signal.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

One benefit of the teachings herein is that the power consumption of the robotic work tool system 200 may be kept low while ensuring a safe operation of the robotic work tool 100.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system, comprising:
a charging station,
a boundary wire, and
a signal generator for generating and transmitting a signal through said boundary wire for demarcating a work area,
said robotic work tool system further comprising a robotic work tool configured to detect a magnetic field strength in the work area and said robotic work tool system being configured to adapt a current level of the signal being transmitted through the boundary wire based on the detected magnetic field strength.

2. The robotic work tool system according to claim 1, wherein the robotic work tool is further configured to communicate with the robotic work tool system to adapt the current level of the signal being transmitted.

3. The robotic work tool system according to claim 2, wherein the robotic work tool is configured for wireless communication during a working operation.

4. The robotic work tool system according to claim 2, wherein the robotic work tool is configured for communication during a charging session.

5. The robotic work tool system according to claim 1, further being configured to compare the detected magnetic field strength to a stored maximum magnetic field strength value and if the detected magnetic field strength is higher than the stored maximum magnetic field strength value, decrease the current level of the signal.

6. The robotic work tool system according to claim 1, further being configured to compare the detected magnetic field strength to a stored minimum magnetic field strength value and if the detected magnetic field strength is lower than the stored minimum magnetic field strength value, increase the current level of the signal.

7. The robotic work tool system according to claim 1, wherein the robotic work tool is further configured to store the detected magnetic field strength by only storing a minimum detected magnetic field strength.

8. The robotic work tool system according to claim 1, wherein the robotic work tool is configured to determine that the detected magnetic field strength is below a detectable level and if so return to the charging station, whereby the robotic work tool system is configured to adapt the current level accordingly.

9. The robotic work tool system according to claim 1, wherein the robotic work tool is configured to detect a surrounding noise level and wherein the robotic work tool system is further configured to determine whether the surrounding noise level is higher than a threshold value and, if so, adapt the current level accordingly.

10. The robotic work tool system according to claim 9, wherein the threshold value is dependent on the transmitted signal strength.

11. The robotic work tool system system according to claim 1, wherein the robotic work tool is configured to detect a second magnetic field emanating from a second signal and wherein the robotic work tool system is configured to adapt a current level of the second signal based on the second detected magnetic field.

12. The robotic work tool system according to claim 1, wherein robotic work tool is a robotic lawnmower.

13. A method for use in a robotic work tool system comprising a robotic work tool, a charging station, a boundary wire and a signal generator for generating and transmitting a signal through said boundary wire for demarcating a work area, said method comprising:
detecting a magnetic field strength in the work area, and
adapting a current level of the signal being transmitted through the boundary wire based on the detected magnetic field strength.

* * * * *